United States Patent
Yamada

(10) Patent No.: US 7,667,794 B2
(45) Date of Patent: Feb. 23, 2010

(54) COLOR ELEMENT-EQUIPPED SUBSTRATE, METHOD FOR MANUFACTURING COLOR ELEMENT-EQUIPPED SUBSTRATE, AND ELECTRONIC DEVICE

(75) Inventor: Yoshiaki Yamada, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 855 days.

(21) Appl. No.: 11/038,385

(22) Filed: Jan. 21, 2005

(65) Prior Publication Data

US 2005/0168526 A1    Aug. 4, 2005

(30) Foreign Application Priority Data

Feb. 4, 2004    (JP)    ............... 2004-028385

(51) Int. Cl.
*G02F 1/1335*    (2006.01)
(52) U.S. Cl. ............................................. 349/106
(58) Field of Classification Search ............ None
See application file for complete search history.

(56) References Cited

U.S. PATENT DOCUMENTS

| | | | |
|---|---|---|---|
| 6,746,102 B2 * | 6/2004 | Shinkoda et al. | 347/40 |
| 7,106,399 B2 | 9/2006 | Kiguchi et al. | |
| 2003/0026896 A1 * | 2/2003 | Shinkoda et al. | 427/162 |
| 2004/0239721 A1 * | 12/2004 | Usuda | 347/40 |

FOREIGN PATENT DOCUMENTS

| | | |
|---|---|---|
| JP | 09-101412 A | 4/1997 |
| JP | H11-326625 A | 11/1999 |
| JP | 2003-288030 A | 10/2003 |

\* cited by examiner

*Primary Examiner*—Sung H Pak
(74) *Attorney, Agent, or Firm*—Global IP Counselors, LLP

(57) ABSTRACT

The color element-equipped substrate of the present invention has a support base, a bank formed on the base that demarcates a pixel region, and a color element formed in the pixel region by depositing droplets of a liquid material in the pixel region. The bank demarcates the pixel region such that the pixel region has a undulated portion. In the color element-equipped substrate, the liquid material can be applied to the entire pixel region.

12 Claims, 10 Drawing Sheets

COLOR ELEMENT-EQUIPPED SUBSTRATE, METHOD FOR MANUFACTURING COLOR ELEMENT-EQUIPPED SUBSTRATE, AND ELECTRONIC DEVICE

BACKGROUND OF THE INVENTION

1. Field of the Invention

The present invention relates to a color element-equipped substrate, a method for manufacturing a color element-equipped substrate, and an electronic device equipped with such color element-equipped substrate.

2. Background Information

It is known that an inkjet apparatus can be used to apply ink or another such liquid material on a light-transmissive substrate and a plurality of pixel regions compartmentalized by a substrate and a bank formed on this substrate. For example, it is known to use an inkjet apparatus to form light emitting portions of a matrix-type display apparatus that are arranged in a matrix, or to form filter elements of a color filter substrate. Japanese Laid-Open Patent Application H9-101412 discloses such inkjet apparatus as an example.

In Japanese Laid-Open Patent Application H9-101412, since each pixel region is in the form of a rectangle when seen in plan view, all four sides facing the pixel region are straight lines. In the manufacture of a color filter substrate, a plurality of ink droplets are discharged from a nozzle and applied (deposited) within each of the pixel regions. The deposited ink droplets overlap each other and spread out within each pixel region on the substrate.

In such cases, the edges of the ink droplets that spread out within each pixel region sometimes do not reach the sides of the pixel regions. Consequently, there are areas within a pixel region where not enough ink is applied due to inadequate spreading of the ink droplets. Also, when light is applied to such color filter substrate, the portions where ink is applied only insufficiently due to inadequate spreading of ink look white, which decreases the quality of a color filter substrate.

In view of the above, it will be apparent to those skilled in the art from this disclosure that there exists a need for improved substrates having color elements, a method for manufacturing a color element-equipped substrate, and electronic devices equipped with such color element-equipped substrate that overcome the problems of the conventional art. This invention addresses this need in the art as well as other needs, which will become apparent to those skilled in the art from this disclosure.

SUMMARY OF THE INVENTION

It is an object of the present invention to provide a color element-equipped substrate, a method for manufacturing a color element-equipped substrate, and an electronic device, in which color components can be formed over an entire pixel region.

The color element-equipped substrate of the present invention has a base, a bank formed on the base, the bank demarcating at least one pixel region such that the pixel region has a undulated portion, and a color element formed in the pixel region by depositing droplets of liquid material in the pixel region.

As a result, since the liquid material is applied within a pixel region that has a undulated portion, the liquid material can spread out in the pixel region and reach the bank securely. In this manner, the liquid material is able to reach the bank effectively. More specifically, the liquid material can spread out thoroughly (effectively) over the entire pixel region, and thus the color element is formed evenly over the entire pixel region.

The method of manufacturing a color element-equipped substrate in accordance with the present invention includes steps of providing a base, forming a bank on the base, the bank demarcating at least one pixel region such that the pixel region has a undulated portion, depositing a plurality of droplets of liquid material in the pixel region, and solidifying the droplets of liquid material.

As a result, a high-quality color element-equipped substrate can be manufactured efficiently.

An electronic device of the present invention includes a main body having an input unit, and a display unit having an image display device and being operatively connected to the input unit such that the input unit controls the display unit. The image display device has a color element-equipped substrate that includes a base, a bank formed on the base, the bank demarcating at least one pixel region such that the pixel region has a undulated portion, and a color element formed in the pixel region by depositing droplets of liquid material in the pixel region.

As a result, an electronic device can be manufactured more efficiently and faster, while also allowing a high-quality electronic device to be provided at a low cost.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
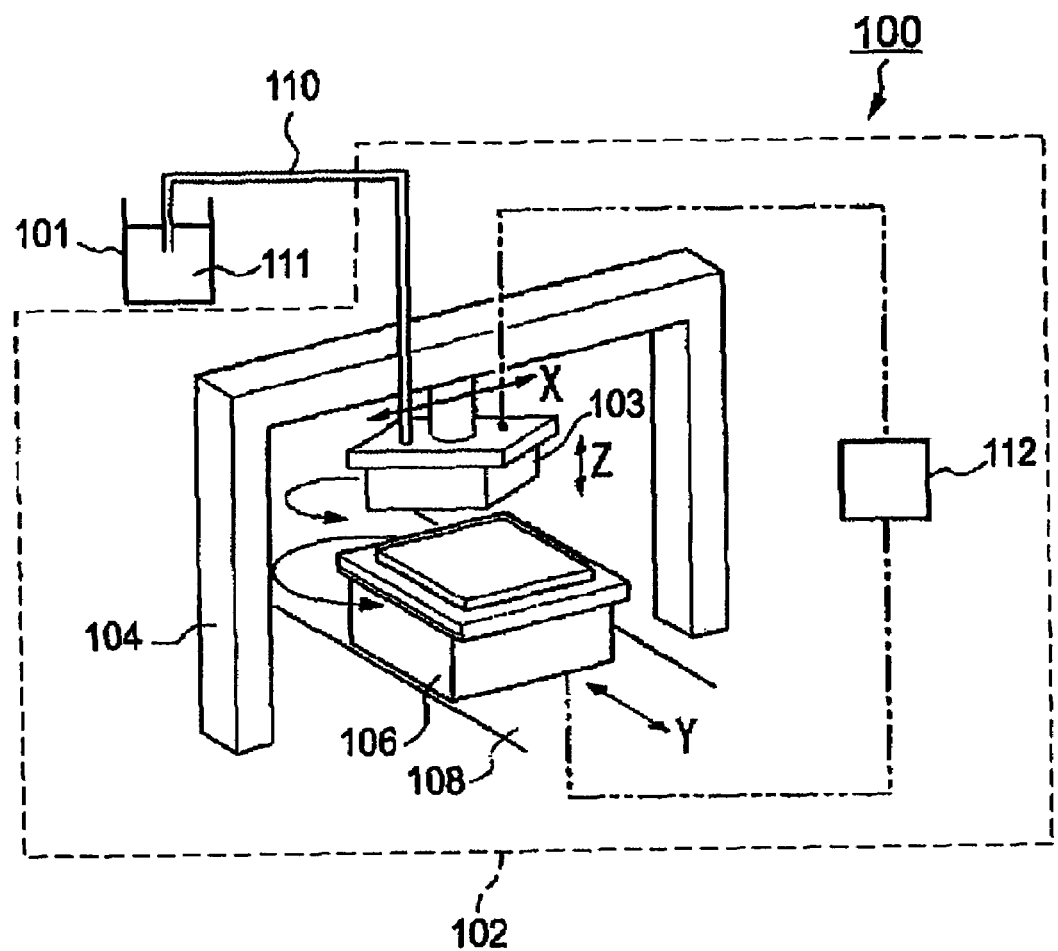
FIG. 1 is an oblique view of a droplet discharge apparatus.

The color element-equipped substrate in accordance with the first aspect of the present invention has a base, a bank formed on the base, the bank demarcating at least one pixel region such that the pixel region has a undulated portion, and a color element formed in the pixel region by depositing droplets of liquid material in the pixel region.

The color element-equipped substrate in accordance with the second aspect of the present invention is the color element-equipped substrate in accordance with the first aspect of the present invention, wherein the bank demarcates the pixel region in a substantially rectangular shape, and at least one pair of opposing sides of the rectangular pixel region is undulated.

The color element-equipped substrate in accordance with the third aspect of the present invention is the color element-equipped substrate in accordance with the first aspect of the present invention, wherein the undulated portion has arc shaped portions, and a radius of curvature of the arc shaped portions is no greater than a radius of dot portions, which are formed on the base by the deposited droplets.

The color element-equipped substrate in accordance with the fourth aspect of the present invention is the color element-equipped substrate in accordance with the first aspect of the present invention, wherein the undulated portion has arc shaped portions, and the arc shaped portions are part of circles that are concentric with dot portions that are formed on the base by the deposited droplets, diameters of the circles being no greater than diameters of the dot portions.

The color element-equipped substrate in accordance with the fifth aspect of the present invention is the color element-equipped substrate in accordance with the fourth aspect of the present invention, wherein the diameters of the circles are 5 to 30% smaller than the diameters of the dot portions.

The method of manufacturing a color element-equipped substrate in accordance with the sixth aspect of the present invention includes steps of providing a base, forming a bank on the base, the bank demarcating at least one pixel region such that the pixel region has a undulated portion, depositing a plurality of droplets of liquid material in the pixel region, and solidifying the deposited droplets of the liquid material.

The method of manufacturing a color element-equipped substrate in accordance with the seventh aspect of the present invention is the method of manufacturing a color element-equipped substrate in accordance with the sixth aspect of the present invention, wherein in the forming of the bank, the undulated shape of the pixel region is determined based on a diameter of a deposited test droplet, which is deposited on a test base prior to the step of forming the bank.

The method of manufacturing a color element-equipped substrate in accordance with the eighth aspect of the present invention is the method of manufacturing a color element-equipped substrate in accordance with the sixth aspect of the present invention, wherein in the depositing of the droplets, the droplets are discharged such that spacing between adjacent droplets is substantially equal to a pitch of undulations of the undulated portion.

The method of manufacturing a color element-equipped substrate in accordance with the ninth aspect of the present invention is the method of manufacturing a color element-equipped substrate in accordance with the sixth aspect of the present invention, wherein in the depositing of the droplets, the droplets are deposited such that adjacent droplets spread out so as to become contiguous to one another and reach the bank.

An electronic device in accordance with the tenth aspect of the present invention includes a main body having an input unit, and a display unit having an image display device and being operatively connected to the input unit such that the input unit controls the display unit. The image display device has a color element-equipped substrate that includes a base, a bank formed on the base, the bank demarcating at least one pixel region such that the pixel region has a undulated portion, and a color element formed in the pixel region by depositing droplets of liquid material in the pixel region.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Droplet Discharge Device

Before the color element-equipped substrate, the method for manufacturing a color element-equipped substrate, and the electronic device having a color element-equipped substrate in accordance with the present invention are described, a droplet discharge apparatus for discharging (applying) the droplets on the substrate (within the pixel region) in the manufacture of the color element-equipped substrate will be described.

As shown in FIG. 1, a droplet discharge apparatus 100 is equipped with a tank 101 for holding a liquid material (hereinafter referred to as "liquid material") 111 for forming a color element, a tube 110, and a discharge scanning unit 102 to which the liquid material 111 is supplied from the tank 101 through the tube 110. The discharge scanning unit 102 is equipped with a droplet discharge unit 103 having a plurality of droplet discharge heads 114 mounted on a carriage 105, a first position control unit 104 (movement means) for controlling the position of the droplet discharge unit 103, a stage 106 for holding a color element-equipped substrate 1A (discussed below), a second position control unit 108 (movement means) for controlling the position of the stage 106, and a control unit 112. The tank 101 is linked via the tube 110 to the plurality of droplet discharge heads 114 in the droplet discharge unit 103, and the liquid material 111 of each of the plurality of droplet discharge heads 114 is supplied from the tank 101 by compressed air.

The first position control unit 104 moves the droplet discharge unit 103 in the X axial direction and the Z axial direction, which is perpendicular to the X axial direction, according to signals from the control unit 112. The first position control unit 104 also has the function of turning the droplet discharge unit 103 around an axis parallel to the Z axis. In this embodiment, the Z axial direction is parallel to the vertical direction (that is, the direction of gravitational acceleration). The second position control unit 108 moves the stage 106 in the Y axial direction (perpendicular to both the X axial direction and the Z axial direction) according to signals from the control unit 112. The second position control unit 108 also has the function of turning the stage 106 around an axis parallel to the Z axial direction.

The stage 106 has a flat surface that is parallel to both the X axial direction and the Y axial direction. The stage 106 is constituted so as to be capable of fixedly holding or supporting on this flat surface the color element-equipped substrate 1A, which has a pixel region 18 to which the liquid material 111 is to be applied.

As discussed above, the droplet discharge unit 103 is moved in the X axial direction by the first position control unit 104. Meanwhile, the stage 106 is moved in the Y axial direction by the second position control unit 108. That is, the relative position of the droplet discharge heads 114 with respect to the stage 106 is changed by the first position control unit 104 and the second position control unit 108.

The control unit 112 is constituted so as to receive from an external information processor discharge data indicating where the liquid material 111 is to be discharged as droplets 111R from nozzles 118 (discussed below) relative to the position of the stag 106. The control unit 112 is operatively connected to the droplet discharge unit 103, the first position control unit 104, and the second position control unit 108 so as to be able to selectively control any of the droplet discharge unit 103, the first position control unit 104, and the second position control unit 108.

Figure 2:
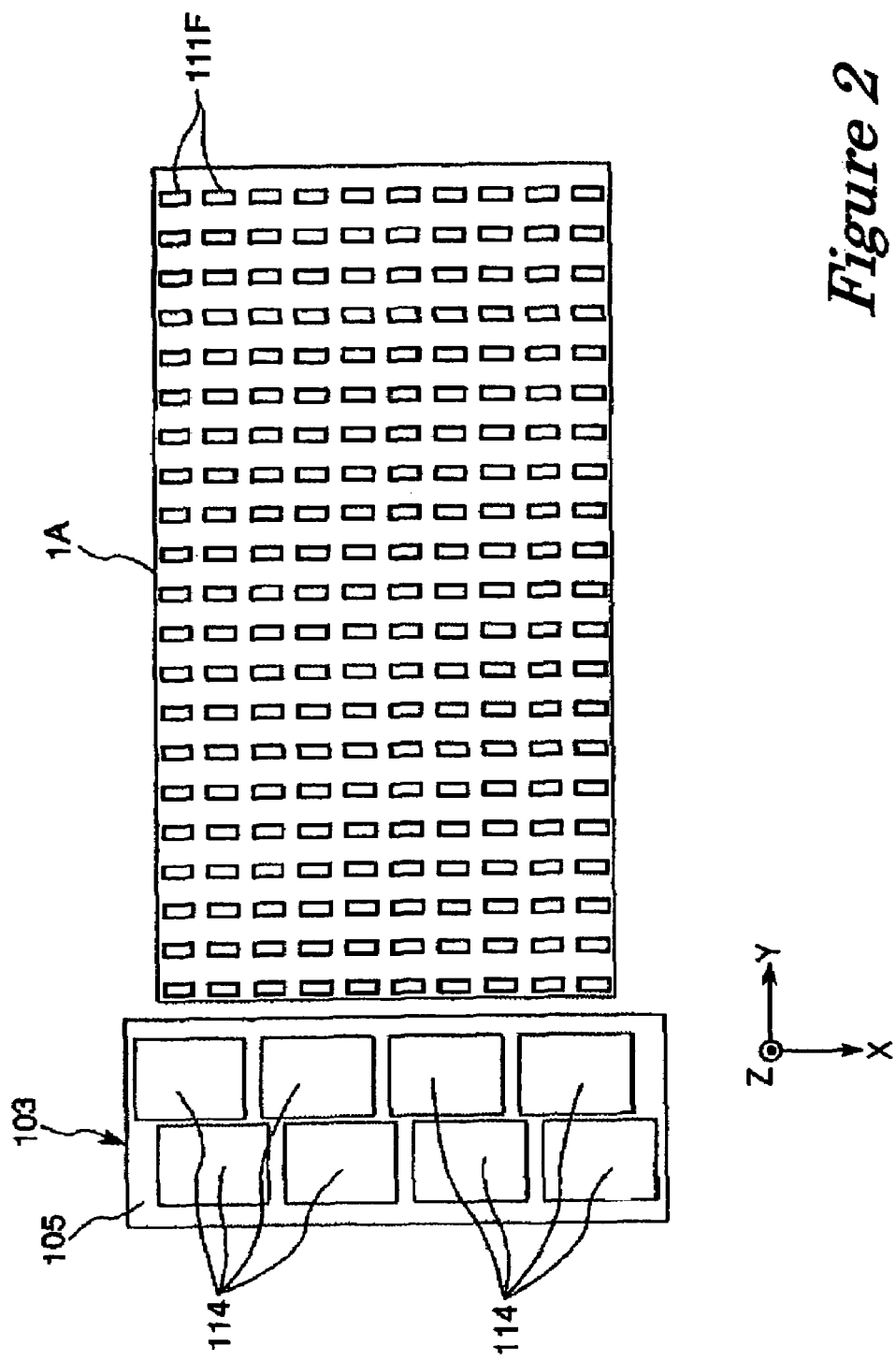
FIG. 2 is a diagram of the droplet discharge unit of the droplet discharge apparatus shown in FIG. 1, as seen from the stage side.

As shown in FIG. 2, the droplet discharge unit 103 has the plurality of droplet discharge heads 114 each of which has substantially the same structure, and the carriage 105 that supports these droplet discharge heads 114. In this embodiment, eight droplet discharge heads 114 are supported by the droplet discharge unit 103. Each of the droplet discharge heads 114 has a bottom surface provided with a plurality of nozzles 118. This bottom of each of the droplet discharge heads 114 is polyhedral in shape, having two long sides and two short sides. The bottoms of the droplet discharge heads 114 supported by the droplet discharge unit 103 face the stage 106, and the long side direction and short side direction of the droplet discharge heads 114 are parallel to the X axial direction and Y axial direction, respectively.

Figure 3:
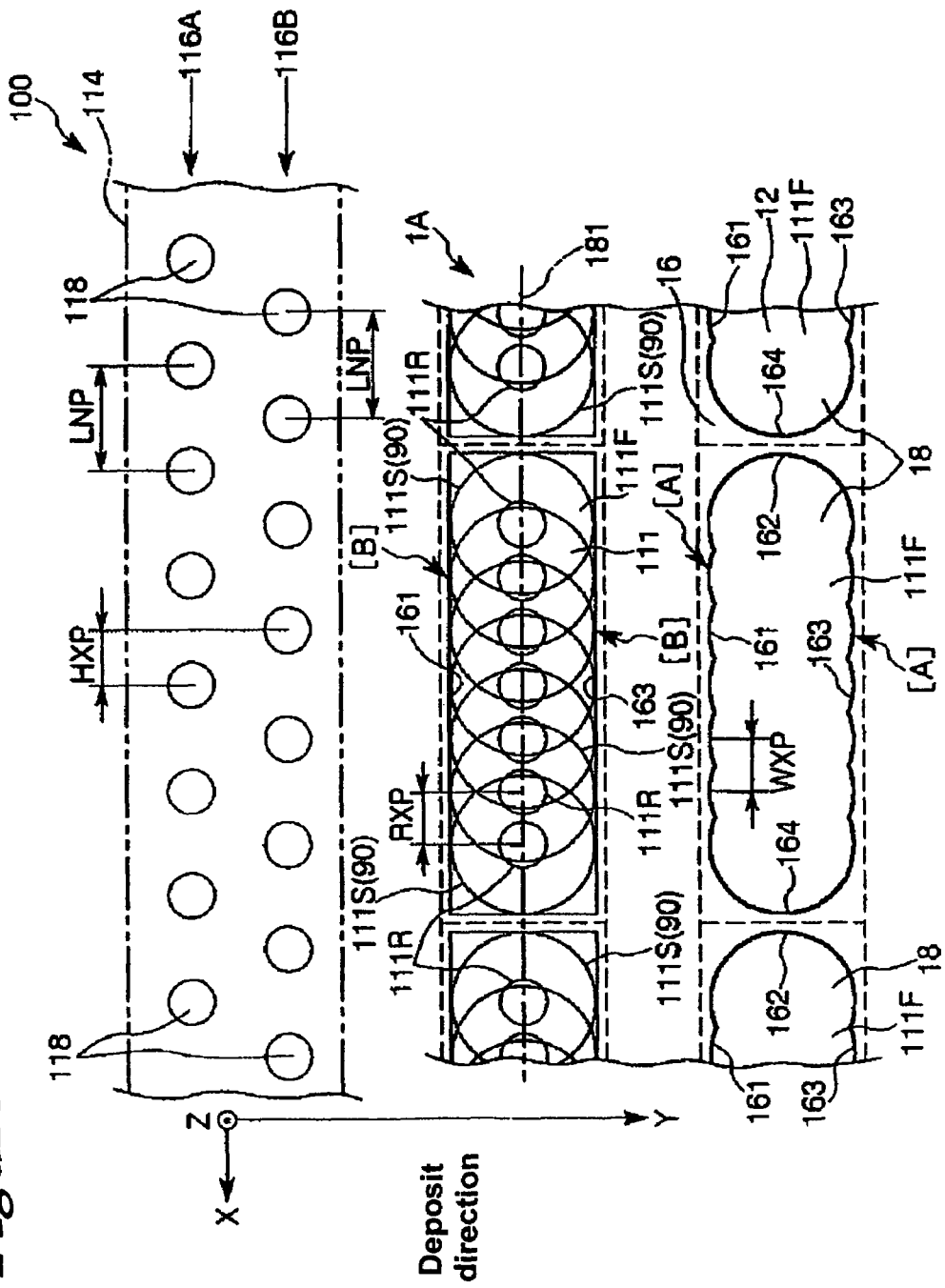
FIG. 3 is a diagram illustrating the positional relationship between the droplet discharge heads of the droplet discharge apparatus shown in FIG. 1 and the color element-equipped substrate in accordance with the first embodiment of the present invention.

As shown in FIG. 3, the droplet discharge heads 114 each have a plurality of nozzles 118 aligned in the X axial direction. These nozzles 118 are arranged at a constant nozzle pitch HXP (such as 70 μm) in the X axial direction of the droplet discharge heads 114.

In this embodiment, the plurality of nozzles 118 of the droplet discharge heads 114 are arranged in a nozzle row 116A and a nozzle row 116B, both of which extend in the X axial direction. The nozzle row 116A and nozzle row 116B are disposed in parallel with a space in between. In each of the nozzle row 116A and nozzle row 116B, the nozzles 118 are aligned in a single row that extends in the X axial direction at a constant nozzle pitch LNP (such as 140 μm when the nozzle pitch HXP is 70 μm).

The position of the nozzle row 116B is shifted with respect to the position of the nozzle row 116A by one-half the nozzle pitch LNP in the forward X axial direction (to the left in FIG. 3). Accordingly, the nozzle pitch HXP of the nozzles 118 in the droplet discharge heads 114 as a whole in the X axial direction is equal to one-half the nozzle pitch LNP of the nozzles 118 in the nozzle row 116A (or the nozzle row 116B). For instance, when the nozzle pitch LNP is 140 μm, the nozzle pitch HXP is 70 μm.

Of course, it is clear from this description that the number of nozzle rows included in the droplet discharge heads 114 is not limited to two. The droplet discharge heads 114 may include any number of nozzle rows, as long as the number of nozzle rows is a natural number of at least 1. Where the number of nozzle rows is M, the nozzles 118 in each of the M number of nozzle rows are arranged at a pitch equal to a length of M times the nozzle pitch HXP. Furthermore, when M is a natural number of at least 2, all M nozzle rows are shifted in the X axial direction without overlapping, each of the M number of nozzle rows being shifted by a length the nozzle pitch HXP with respect to another nozzle row.

The term "liquid material" in this specification refers to a material having a viscosity that allows discharge from a nozzle. It does not matter in this case whether the material is water-based or oil-based. All it needs is to have a fluidity (viscosity) that permits the liquid material to be discharged from a nozzle, and a solid substance (such as a colorant) may be admixed as long as the material has sufficient fluidity overall.

The color element-equipped substrate, the method for manufacturing a color element-equipped substrate, and the electronic device having such color element-equipped substrate in accordance with the present invention will now be described in detail with reference to the preferred embodiments shown in the appended drawings.

First Embodiment

Color Element-Equipped Substrate

The color element-equipped substrate 1A of the present invention is a color element-equipped substrate having a plurality of filter layers 111F (color elements) disposed on a light-transmissive support base (base) 12 (see FIG. 2).

Each of the filter layers 111F is produced by solidifying or curing the liquid material 111 applied as the plurality of droplets 111R in pixel regions 18 corresponding to subpixels demarcated by a bank 16 that is provided on the support base 12. The method for solidifying or curing the liquid material 111 will be discussed below in regard to the method for manufacturing a color element-equipped substrate 1A.

As shown in FIG. 3, the pixel region 18 is rectangular (strip-shaped) in plan view (when seen from the Z axial direction in FIG. 3). Among the four sides 161, 162, 163, and 164 of the bank 16 that demarcates this pixel regions 18, sides 161 and 163 are an opposing pair of sides that are undulated in plan view in the portion facing the pixel region 18 (the portions marked as A in FIG. 3).

The undulated shape shown in FIG. 3 is similar to the shape of the outer peripheral portion (the portion marked as B in FIG. 3) of a figure (hereinafter referred to as "hypothetical figure") that would be produced by assembling together the outer contour of seven circles 90, which are assumed to have the same diameters as those of seven dots 111S. The dots 111S are created by a plurality of droplets 111R (for example, seven in this embodiment), that are applied to the pixel region, and are aligned in the X axial direction at the nozzle pitch HXP. The pitch (spacing) WXP of the undulations of the undulated shape in the portion A is substantially the same as the nozzle pitch HXP.

The X axial end portions, in other words the four inside corners and the sides 162 and 164 of the pixel region 18 have substantially the same shapes as the arcs of the circles 90. Due to this configuration, the seven droplets 111R of the liquid material 111 applied as above are able to reach the bank 16 more effectively. In other words, the droplets 111R are able to spread out over the entire pixel region 18 more effectively.

The size of the pixel region 18 is not limited to substantially the same size as the size of the hypothetical figure delineated by the marks B, and may instead be slightly smaller.

Manufacturing Method

This color element-equipped substrate 1A is manufactured by the method of manufacturing a color element-equipped substrate in accordance with the present.

The method of manufacturing a color element-equipped substrate will now be described in accordance with an embodiment of the present invention. The method described here is a method of forming a color filter substrate, which is an example of the color element-equipped substrate 1A.

Figure 5:
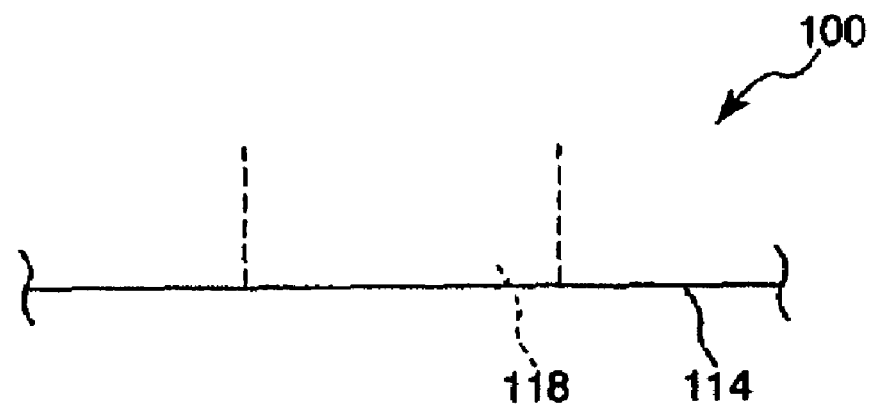
FIG. 5 is a side view of a test droplet discharged from the droplet discharge heads of the droplet discharge apparatus shown in FIG. 1 being deposited on a test substrate.
Figure 5:
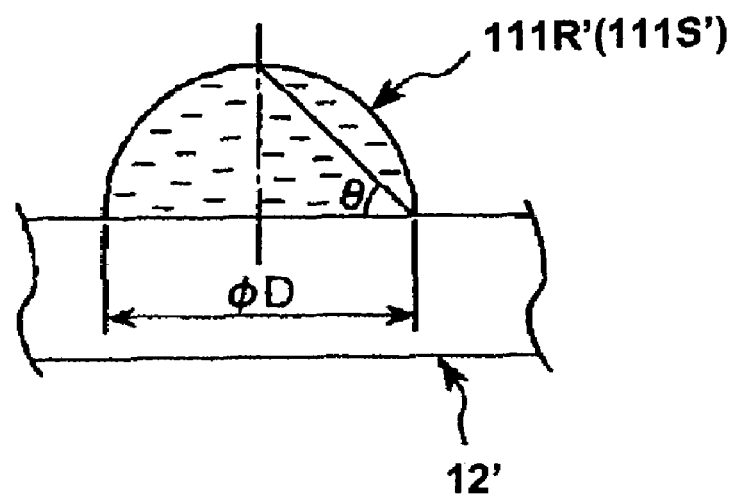
Figure 6:
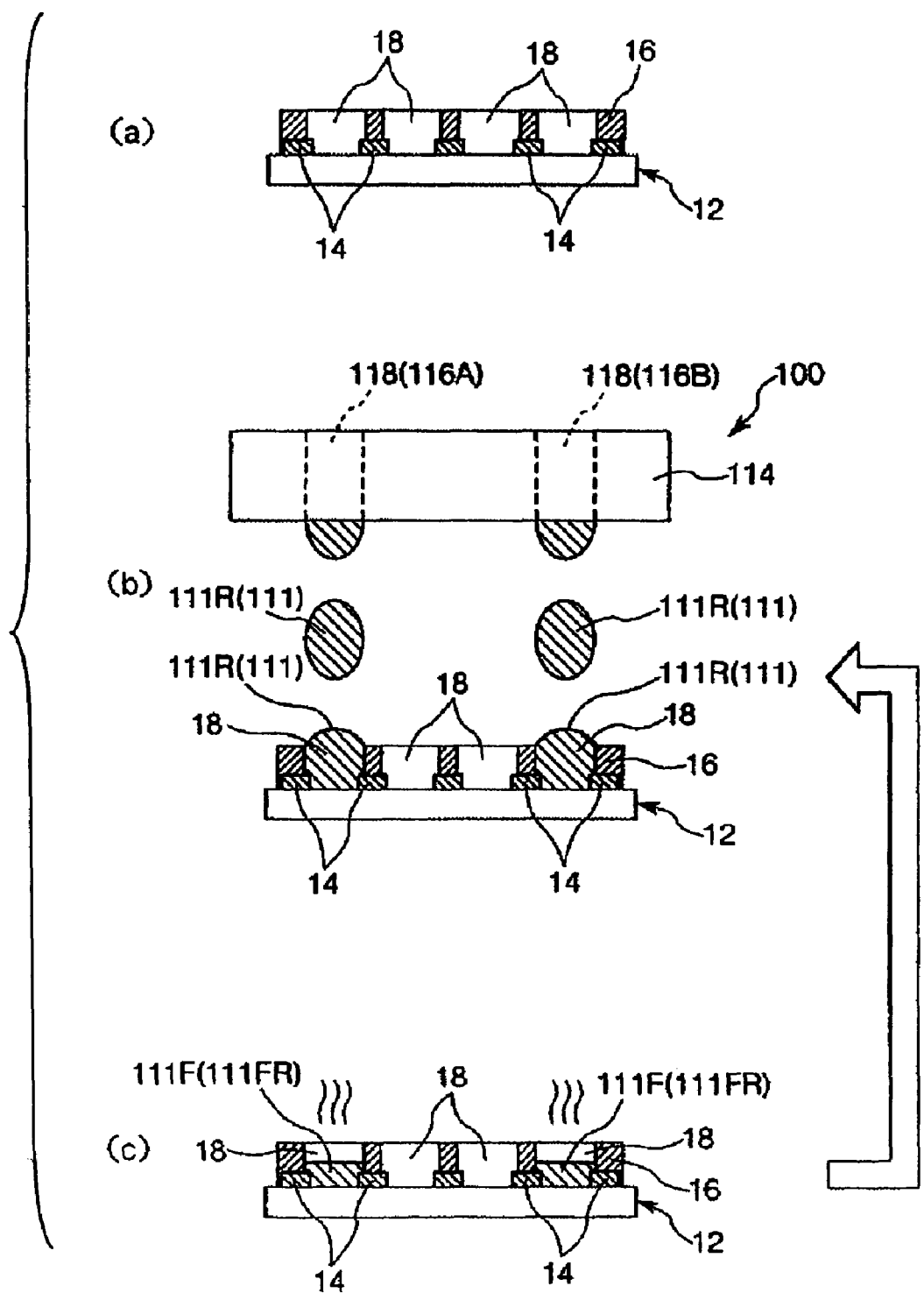
FIG. 6 is a diagram illustrating the steps of manufacturing a color element-equipped substrate in accordance with the embodiment of the present invention.

FIG. 5 is a side view of a droplet that has been discharged from the droplet discharge head of the droplet discharge apparatus shown in FIG. 1 and has landed on a base 12. FIGS. 6 and 7 are diagrams illustrating the sequential steps of manufacturing a color element-equipped substrate.

Bank Formation Step

The shape of the undulated portions of the bank 16 that face the pixel region 18, in other words the plan view shapes of the pixel regions 18, are described above. This shape can be obtained or determined as follows. First, as shown in FIG. 5, the droplet discharge apparatus 100 is used to apply or deposit a test droplet 111R' having a volume V (such as 10 pL) on a test support base 12'.

Next, the contact angle of the deposited test droplet 111R' (the angle indicated by θ in FIG. 5) is measured, and the deposited diameter (the length indicated by φD in FIG. 5) of the deposited test droplet 111R' (or test dot 111S') is obtained from the relationship between this contact angle θ and the volume V. In this description, this deposited diameter φD is assumed to be the diameter of the circle 90 here. For example, when the volume V is 10 pL and the contact angle θ is 10 degrees, for instance, the deposited diameter φD is found to be approximately 60 μm. The manner in which the deposited diameter φD is obtained is not limited to this calculation based on the relationship between this contact angle θ and the volume V; instead, the deposited diameter φD be obtained by other calculation or by measurement with a camera.

Using the deposited diameter φD obtained in this manner, the sides 162 and 164 of the pixel region 18 are formed in the shapes of arcs (half arcs) having a diameter that is substantially the same as the deposited diameter φD of the of the circle 90 (see FIG. 3).

Also, the sides 161 and 163 are formed such that the radius of curvature at the curved portions is substantially the same as the radius of curvature of the circle 90 (whose diameter is D), and the pitch (wavelength) WXP of the undulations in the sides 161 and 163 is substantially the same as the nozzle pitch HXP. Also, the number of the wave pitches WXP here is six because there are seven deposited droplets 111R, as mentioned above (see FIG. 3).

The shape of the bank 16 and the pixel region 18 is determined by the above method.

Next, the bank 16 whose shape has been determined as described above is formed on the support base 12 as shown in FIG. 6a. First, a metal thin film is formed on the support base 12 by sputtering or vapor deposition. Then a black matrix 14 is formed from this metal thin film by photolithography. Examples of the material for the black matrix 14 include metallic chromium and chromium oxide.

The support base 12 is a substrate that is light-transmissive with respect to visible light. Examples of such support base include a glass substrate. Next, the support base 12 and the black matrix 14 are completely coated with a negative resist layer composed of a photosensitive resin composition. A mask film formed in a mask pattern is applied snugly over this resist layer, and this resist layer is exposed to light. In doing so, the undulated shapes discussed above are defined in portions of the mask film corresponding to the pixel regions 18. Accordingly, the unexposed portions of the resist layer also have undulated shapes. After this, the unexposed portions of the resist layer are removed by washing (for example, with a shower) to obtain the bank 16. Specifically, this yields a pixel region 18 having the undulated shape discussed above.

The method of obtaining the pixel regions 18 having a undulated shape is not limited to the above-mentioned method, in which the undulated shape is formed in the mask film. For example, the undulated shapes may be formed with pinholes or the like such that the curved portions of the undulated portions are over-etched relative to than the other portions.

Next, the support base 12 on which the bank 16 has been formed is rendered lyophilic by oxygen plasma treatment under atmospheric pressure.

Droplet Depositing Step

Next, as shown in FIG. 6b, the droplet discharge apparatus 100 is used to discharge the droplets 111R of the liquid material 111 from the droplet discharge heads 114 of the nozzles 118 toward the pixel region 18. In the example of FIG. 3, seven droplets 111R are discharged. Accordingly, the droplets 111R and are applied in the pixel region 18. The droplets 111R here form a red filter layer 111FR, for example.

More specifically, the droplet discharge apparatus 100 discharges the droplets 111R such that the pitch (spacing) RXP (see FIG. 3) between two droplets 111R that land adjacent to each other on the approximate center line 181 is substantially the same as the wave pitch WXP of the sides 161 and 163. The center line 181 extends in the lengthwise direction of the pixel region 18. Also, the droplet discharge apparatus 100 discharges the droplets 111R so that the centers of the deposited droplets 111R substantially coincide with the centers of the circles 90.

This discharge method allows the liquid material 111 to spread out more effectively over the entire pixel region 18.

Also, the droplet discharge apparatus 100 causes the seven droplets 111R to land so that at least droplets that land adjacent to each other spread out and become contiguous with one another, and that the spread-out droplets reach the bank.

This allows the liquid material 111 to be applied the entire surface of the pixel region 118.

Filter Layer Formation Step (Color Component Formation Step)

After the liquid material 111 applied in the droplet depositing step has spread out over the entire pixel region 18, the liquid material 111 within the pixel region 18 is dried by the operation of a drying apparatus (not shown). This drying solidifies (cures) the liquid material 111 and forms the filter layer 111FR (i.e., red subpixels)(see FIG. 6c). The droplet depositing step and the drying step are repeated a plurality of times before the filter layer 111FR is completed.

Figure 7:
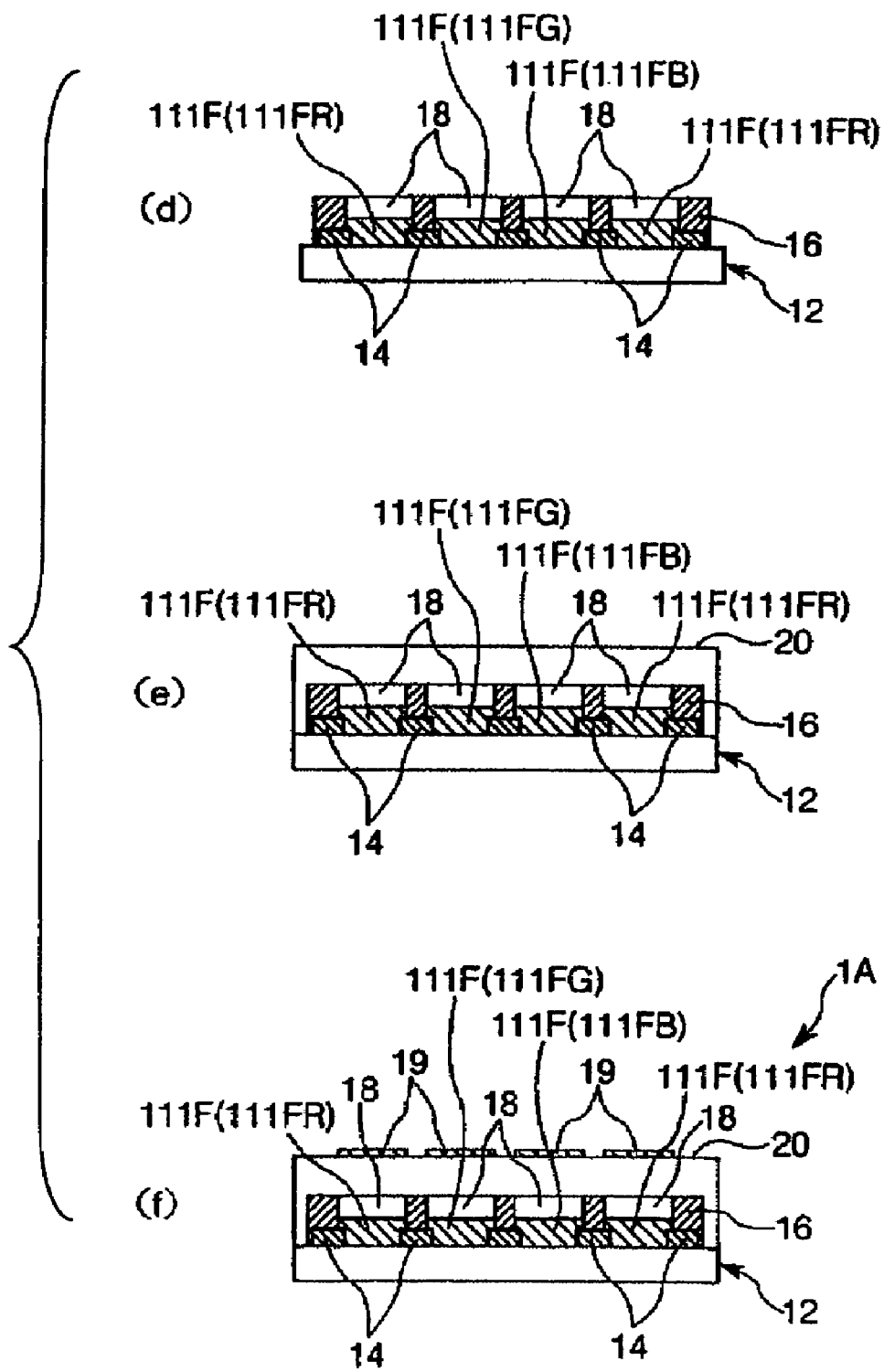
FIG. 7 is a diagram illustrating the steps of manufacturing a color element-equipped substrate in accordance with the embodiment of the present invention.

Next, the droplet depositing step and the filter layer formation step are repeated in substantially the same manner to form a green filter layer 111FG (i.e., green subpixels) and a blue filter layer 111FB (i.e., blue subpixels)(see FIG. 7d). Next, the base 12 on which the filter layers 111FR, 111FG, and 111FB have been formed is heated in an oven (not shown), and then taken out of the oven.

Protective Film Formation Step

Next, the droplet discharge apparatus 100 discharges a liquid protective film material so as to form a protective film 20 covering the filter layers 111FR, 111FG, and 111FB and the bank 16. After the protective film 20 has been formed covering the filter layers 111FR, 111FG, and 111FB and the bank 16, the protective film 20 is completely dried again in the above-mentioned oven.

Next, the protective film 20 is heated in a curing apparatus (not shown in figures) and completely cured (see FIG. 7e).

ITO Circuit Installation Step

As shown in FIG. 7f, an ITO circuit 19 is then mounted (installed) on the protective film 20 to form (manufacture) the color element-equipped substrate, which is an example of the color filter substrate 1A.

The purpose of forming the undulated shape is not only to determine the depositing positions of the droplets 111R. For example, by forming the pixel region 18 with the undulated shape, the surface area over which the bank 16 facing the pixel region 18 comes into contact with the filter layers 111F of the liquid material 111 can be increased.

Second Embodiment

Figure 4:
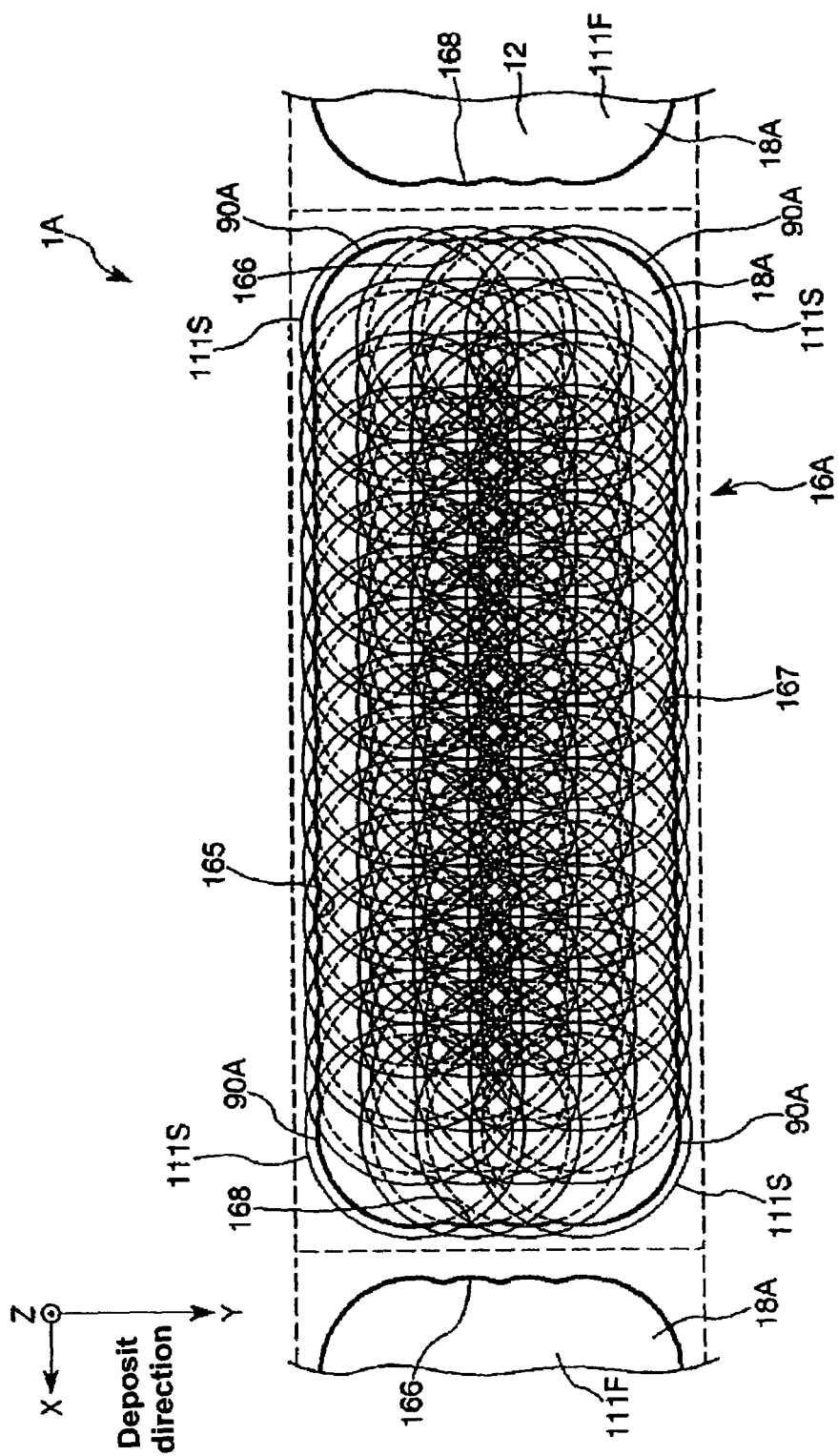
FIG. 4 is a diagram of the color element-equipped substrate in accordance with the second embodiment of the present invention.

FIG. 4 is a diagram of a color element-equipped substrate in accordance with the second embodiment of the present invention.

A second embodiment of the color element-equipped substrate of the present invention will now be described through reference to the drawings. In view of the similarities between the first and second embodiments, the description of the second embodiment herein will focus on the differences from the embodiment given above, and parts of the second embodiment that are similar to the second embodiment will be given the same reference numbers. Explanation of such parts will be omitted herein.

The color element-equipped substrate in accordance with the second embodiment is substantially similar to that of the first embodiment, except that the shape of the pixel region is different.

As shown in FIG. 4, in a bank 16A that demarcates a pixel region 18A, the four sides 165, 166, 167, and 168 surrounding the pixel region 18A are each undulated in plan view in the portions facing the pixel region 18A.

This undulated shape resembles to an outer contour of the figure which will now be described.

As seen in FIG. 4, this undulated shape is produced by assembling together a plurality of circles 90A, which are assumed to have a diameter smaller than that of dots 111S. The dots 111S are created by deposited droplets 111R, which are arranged in a matrix form of 16 in the X axial direction and 4 in the Y axial direction. The pitch between two droplets 111R that are adjacent to one another on the X axial direction is approximately the nozzle pitch HXP. The pitch between two droplets 111R that are adjacent to one another on the Y axial direction is approximately the same as the discharge pitch (deposit pitch) of the droplets 11 R in the droplet discharge apparatus 100.

The four inside corners of the pixel region 18A each have substantially the same shape as the arc of the circle 90A.

This configuration affords the same effects as the configuration in the first embodiment.

It is preferable for the diameter of the circles 90A to be from 5 to 30% smaller, and even more preferably 10 to 20% smaller, than the outside diameter of the dots 111S.

As a result, the liquid material 111 can spread out even more effectively over the entire pixel region 18A.

Electronic Device

An image display device (electro-optical device) 1000 such as an image display device equipped with the above-mentioned color element-equipped substrate 1A of the first embodiment of the present invention will be explained. Such image display device 1000 can be used as the display components of various electronic devices.

Figure 8:
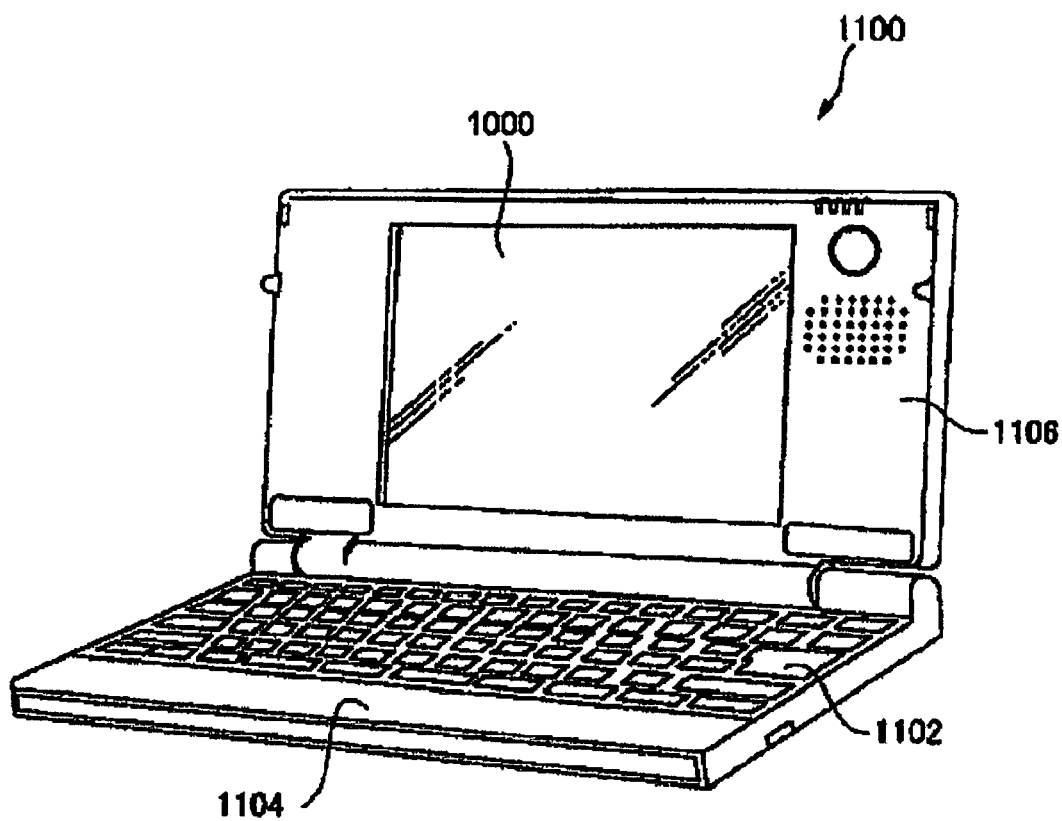
FIG. 8 is an oblique view of the a mobile type personal computer as an electronic device of in accordance with the embodiment of the present invention.

FIG. 8 is an oblique view of the structure of a mobile (or notebook) type personal computer, which is an example of the electronic device in accordance with the present invention. In this drawing, a personal computer 1100 includes a main unit 1104 equipped with a keyboard 1102, and a display unit 1106. The display unit 1106 is piovotably supported on the main unit 1104 via a hinge structure. The display unit 1106 is operatively connected to the keyboard 1102, such that the keyboard 1102 controls the display unit 1106.

In this personal computer 1100, the display unit 1106 is equipped with the image display device 1000.

Figure 9:
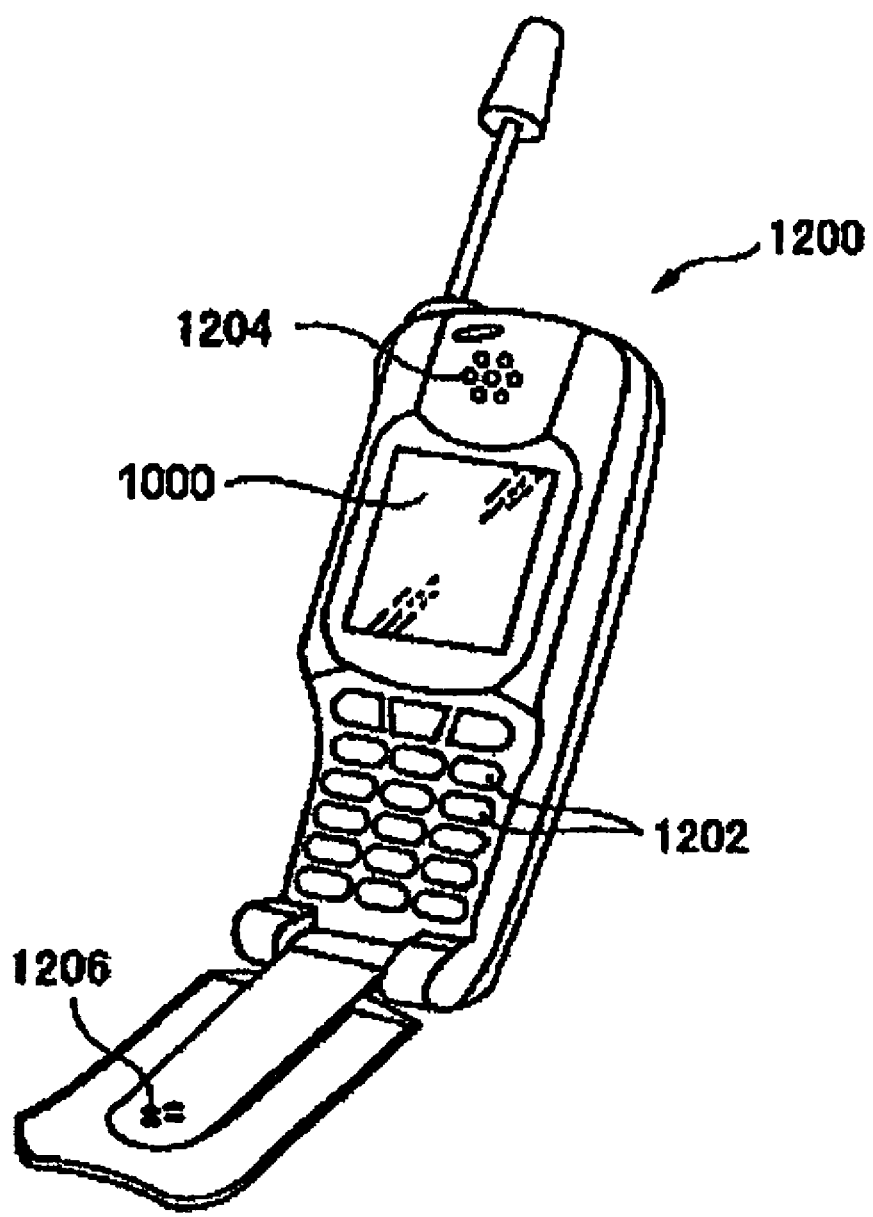
FIG. 9 is an oblique view of the mobile telephone as an electronic device of in accordance with the embodiment of the present invention.

FIG. 9 is an oblique view of the structure of a mobile telephone (including cellular phone and PHS or personal handyphone system), which is another example of the electronic device in accordance with the present invention. In this drawing, a mobile telephone 1200 is equipped with a plurality of control buttons 1202, an earpiece 1204, and a mouthpiece 1206, and an image display device 1000, which is provided as a display component. The image display device 1000 is operatively connected to the control buttons 1202, such that the control buttons 1202 control the image display device 1000.

Figure 10:
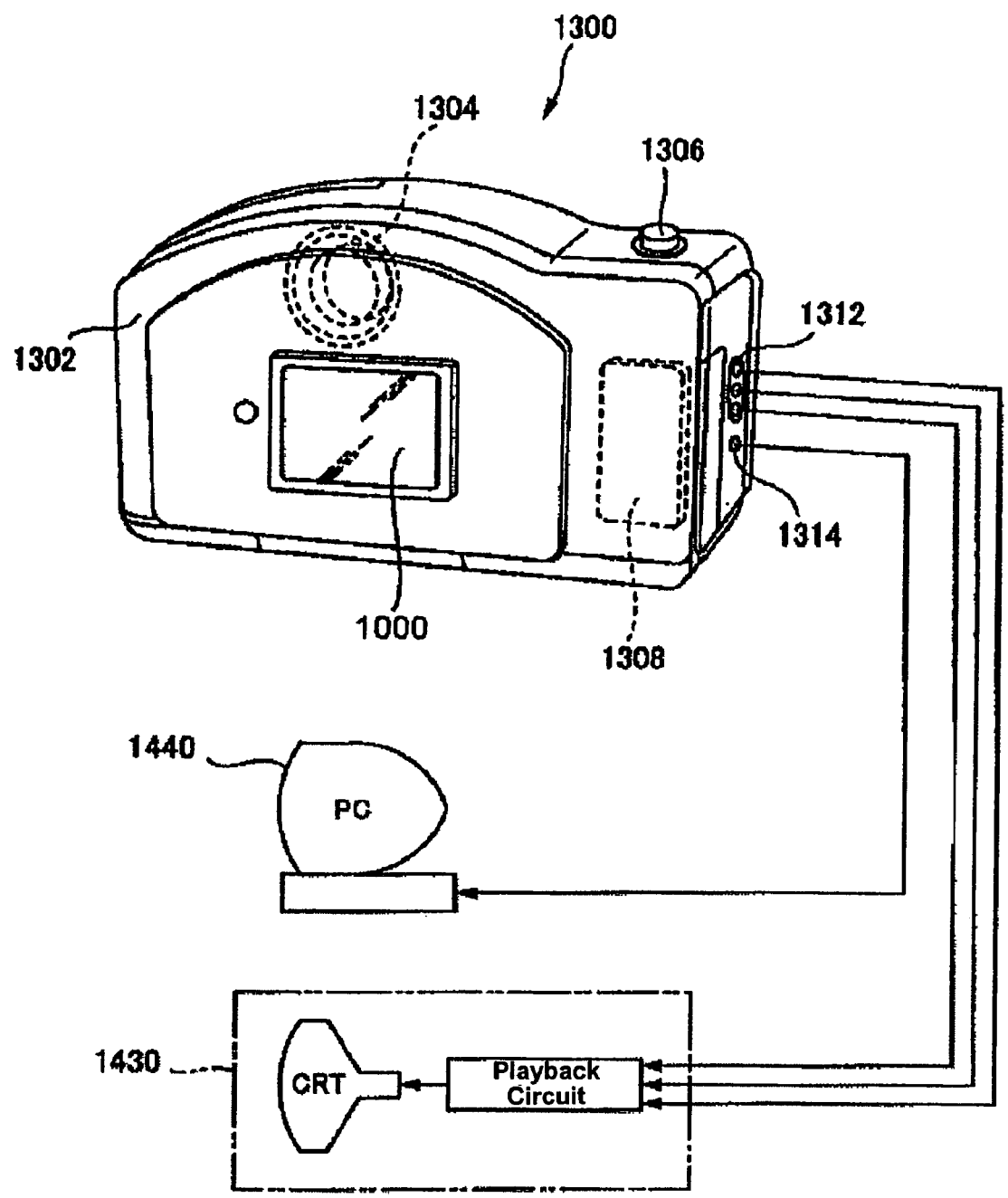
FIG. 10 is a schematic view of the digital still camera and external devices connected thereto, as an electronic device of in accordance with the embodiment of the present invention.

FIG. 10 is an oblique view of a digital still camera 1300, which is still another example of the electronic device in accordance with the present invention. This diagram also illustrates in a simplified form external devices that can be connected to the digital camera 1300. With a non-digital camera, silver halide photographic film is exposed with the optical image of the subject, whereas with the digital still camera 1300, the optical image of the subject is subjected to photo-electric conversion using image capturing components such as a CCD (Charge Coupled Device) or other such image capturing component to produce an image capturing signal (image signal).

The image display device 1000 is provided as the display component on the back of the case (body) 1302 of the digital still camera 1300, such that the display is performed based on the image capturing signals produced by the CCD. This image display device 1000 therefore functions as a viewfinder that displays the subject as an electronic image. A circuit substrate 1308 is installed inside the case. This circuit substrate 1308 is equipped with a memory which is capable of storing the image pickup signals. The image display device 1000 is operatively connected to a shutter button 1306, such that the shutter button 1306 controls the image display device 1000.

A light receiving unit 1304 including a light receiving lens (image pickup optical system), CCD, or the like is provided to the front side the (the side opposite the side shown in the drawing) of the case 1302. When the user checks the subject image displayed in the display component, and presses a shutter button 1306, the image capturing signal of the CCD at that point is transferred to and stored in the memory of the circuit substrate 1308.

Also, a video signal output terminal 1312 and a data communication-use input/output terminal 1314 are provided to the side of the case 1302 of this digital still camera 1300. As shown in the drawing, a television monitor 1430 can be connected as needed to the video signal output terminal 1312, and a personal computer 1440 to the data communication-use input/output terminal 1314. The system is designed so that when a certain operation is performed, the image capturing signal stored in the memory of the circuit substrate 1308 can be outputted to the television monitor 1430 or the personal computer 1440.

The electronic devices in accordance with the present invention include not only the above-mentioned personal computers (mobile type personal computers), mobile telephones, and digital still cameras, but also television sets, video cameras, viewfinder type or monitor view type video tape recorders, laptop personal computers, car navigation units, pagers, electronic notebooks (including those with communication functions), electronic dictionaries, calculators, electronic game devices, word processors, work stations, video telephones, security television monitors, electronic binoculars, POS terminals, devices equipped with touch panels (such as cash dispensers at financial institutions, and ticket vending machines), medical devices (such as electronic thermometers, blood pressure gauges, blood sugar gauges, electrocardiogram display devices, ultrasonic diagnostic devices, and endoscopic display devices), fish school finders, various kinds of measurement devices, gauges (such as gauges for automobiles, aircraft, and ships), flight simulators, various other kinds of monitors, projectors and other projection type display devices, and so forth.

The color element-equipped substrate, the method for manufacturing such color element-equipped substrate, and the electronic device having such color element-equipped substrate of the present invention are described above with reference to the illustrated embodiments. However, the present invention is not limited to these embodiments. Various components that make up the color element-equipped substrate can be substituted with those capable of exhibiting and performing similar functions. Also, other structural elements may be added to the arrangements described in the foregoing embodiments.

Also, the shape of the pixel region is not limited to plan view rectangular shapes. Pixel regions can have, for example, square, trapezoidal, parallel four-sided (diamond-shaped), or other such quadrilateral shape, hexagonal, oval, or other shapes. Similarly, the shape of the portion of the bank facing the pixel region is not limited to the shapes discussed in the foregoing embodiments, and can be, for example, a sine curve shape, a bumpy shape, a shape having small curves, or other such undulated shape.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-028385. The entire disclosure of Japanese Patent Application No. 2004-028385 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A color element-equipped substrate comprising:
   a base;
   a bank formed on the base, the bank having an undulated surface and demarcating at least one pixel region such that the pixel region has an undulated portion, the pixel region corresponding to a single subpixel of the color element-equipped substrate; and
   a color element formed in the pixel region by depositing droplets of liquid material in the pixel region.

2. A color element-equipped substrate comprising:
   a base;
   a bank formed on the base, the bank demarcating at least one pixel region such that the pixel region has an undulated portion with the pixel region corresponding to a single subpixel of the color element-equipped substrate, the bank demarcating the pixel region in a substantially rectangular shape with at least one pair of opposing sides of the rectangular pixel region being undulated; and
   a color element formed in the pixel region by depositing droplets of liquid material in the pixel region.

3. The color element-equipped substrate according to claim 1, wherein
   the undulated portion has arc shaped portions, and
   a radius of curvature of the arc shaped portions is no greater than a radius of dot portions, which are formed on the base by the deposited droplets.

4. A color element-equipped substrate comprising:
   a base;
   a bank formed on the base, the bank demarcating at least one pixel region such that the pixel region has an undulated portion with the pixel region corresponding to a single subpixel of the color element-equipped substrate, the undulated portion having arc shaped portions, the arc shaped portions being part of circles that are concentric with dot portions that are formed on the base by the deposited droplets, diameters of the circles being no greater than diameters of the dot portions; and
   a color element formed in the pixel region by depositing droplets of liquid material in the pixel region.

5. The color element-equipped substrate according to claim 4, wherein
   the diameters of the circles are 5 to 30% smaller than the diameters of the dot portions.

6. A method for manufacturing the color element-equipped substrate, comprising steps of:
   providing a base;
   forming a bank on the base, the bank having an undulated surface and demarcating at least one pixel region such that the pixel region has an undulated portion, the pixel region corresponding to a single subpixel of the color element-equipped substrate;
   depositing a plurality of droplets of liquid material in the pixel region; and
   solidifying the deposited droplets of the liquid material.

7. A method for manufacturing a color element-equipped substrate comprising steps of:
   providing a base;
   forming a bank on the base, the bank demarcating at least one pixel region such that the pixel region has an undulated portion, the pixel region corresponding to a single subpixel of the color element-equipped substrate;
   depositing a plurality of droplets of liquid material in the pixel region; and
   solidifying the deposited droplets of the liquid material,
   in the forming of the bank, the undulated shape of the pixel region is determined based on a diameter of a deposited test droplet, which is deposited on a test base prior to the step of forming the bank.

8. A method for manufacturing a color element-equipped substrate comprising steps of:
   providing a base;
   forming a bank on the base, the bank demarcating at least one pixel region such that the pixel region has an undulated portion, the pixel region corresponding to a single subpixel of the color element-equipped substrate;

depositing a plurality of droplets of liquid material in the pixel region; and solidifying the deposited droplets of the liquid material, in the depositing of the droplets, the droplets are discharged such that spacing between adjacent droplets is substantially equal to a pitch of undulations of the undulated portion.

9. The method for manufacturing a color element-equipped substrate according to claim 6, wherein in the depositing of the droplets, the droplets are deposited such that adjacent droplets spread out so as to become contiguous to one another and reach the bank.

10. An electronic device, comprising a main body having an input unit; and a display unit having an image display device and being operatively connected to the input unit such that the input unit controls the display unit, the image display device having a color element-equipped substrate that includes a base;

a bank formed on the base, the bank having an undulated surface and demarcating at least one pixel region such that the pixel region has an undulated portion with the pixel region corresponding to a single subpixel of the color element-equipped substrate; and a color element formed in the pixel region by depositing droplets of liquid material in the pixel region.

11. The method for manufacturing the color element-equipped substrate according to claim 6, wherein the depositing of the droplets of liquid material includes depositing the droplets from a plurality of nozzles aligned in a droplet discharge head, and the forming of the bank includes forming the undulated portion in the pixel region so that a pitch between undulations of the undulated portion is substantially equal to a pitch between the nozzles in the droplet discharge head.

12. The color element-equipped substrate according to claim 2, wherein the bank is formed so that all of four sides of the rectangular pixel region are undulated.

* * * * *